United States Patent
Gottlieb et al.

(10) Patent No.: US 8,544,343 B2
(45) Date of Patent: *Oct. 1, 2013

(54) CHORDAL GAS FLOWMETER WITH TRANSDUCERS INSTALLED OUTSIDE THE PRESSURE BOUNDARY

(75) Inventors: Emanuel J. Gottlieb, Upper St. Clair, PA (US); Donald R. Augenstein, Pittsburgh, PA (US); William R. Freund, Jr., Moon Township, PA (US); Richard A. Zuckerman, Pittsburgh, PA (US); Herbert Estrada, Annapolis, MD (US); Calvin R. Hastings, Mt. Lebanon, PA (US)

(73) Assignee: Cameron International Corporation, Houston, TX (US)

( * ) Notice: Subject to any disclaimer, the term of this patent is extended or adjusted under 35 U.S.C. 154(b) by 413 days.

This patent is subject to a terminal disclaimer.

(21) Appl. No.: 12/927,616

(22) Filed: Nov. 19, 2010

(65) Prior Publication Data

US 2012/0125121 A1    May 24, 2012

(51) Int. Cl.
*G01F 1/66* (2006.01)
(52) U.S. Cl.
USPC ............................................................ 73/861.28
(58) Field of Classification Search
None
See application file for complete search history.

(56) References Cited

U.S. PATENT DOCUMENTS

| | | | | |
|---|---|---|---|---|
| 4,024,760 A | * | 5/1977 | Estrada, Jr. | 73/861.31 |
| 4,103,551 A | * | 8/1978 | Lynnworth | 73/861.27 |
| 5,179,862 A | * | 1/1993 | Lynnworth | 73/861.28 |
| 5,962,790 A | * | 10/1999 | Lynnworth et al. | 73/644 |
| 6,279,379 B1 | * | 8/2001 | Logue et al. | 73/24.01 |
| 6,343,511 B1 | * | 2/2002 | Lynnworth et al. | 73/644 |
| 6,354,146 B1 | * | 3/2002 | Birchak et al. | 73/61.79 |
| 7,093,502 B2 | * | 8/2006 | Kupnik et al. | 73/861.29 |
| 7,152,490 B1 | * | 12/2006 | Freund et al. | 73/861.27 |
| 7,628,081 B1 | * | 12/2009 | Feller | 73/861.27 |
| 7,911,306 B2 | * | 3/2011 | Allen | 336/90 |
| 8,132,469 B2 | * | 3/2012 | Allen | 73/861.18 |
| 8,186,229 B2 | * | 5/2012 | Allen | 73/861.18 |
| 2004/0013570 A1 | * | 1/2004 | Labuda et al. | 422/82.08 |
| 2007/0062254 A1 | * | 3/2007 | Gysling et al. | 73/19.03 |
| 2010/0095782 A1 | * | 4/2010 | Ferencz et al. | 73/861.28 |
| 2012/0125122 A1 | * | 5/2012 | Gottlieb et al. | 73/861.28 |

\* cited by examiner

*Primary Examiner* — Harshad R Patel
(74) *Attorney, Agent, or Firm* — Ansel M. Schwartz (57) ABSTRACT

A flowmeter for detecting gas flow rates in a pipe includes a container configured to be attached to the pipe having a channel through which the gas flows, and a plurality of recesses. Each recess has a window made of metal. The flowmeter includes a plurality of transducers, with one transducer of the plurality of transducers disposed in each recess. The flowmeter includes a controller which determines the gas flow rate through the channel.

19 Claims, 8 Drawing Sheets

CEESI Iowa Flow Calibration
CALIBRATION RESULTS

Customer : Cameron Technologies
Serial Number : 101006001
Sales Order # : N/A
Purchase Order # : 4502529806
Date : 15-Oct-10
Flow Conditioning : No Flow Conditioning
Flow Direction = Forward

| Meter I.D. | Meter I.D. |
|---|---|
| m | m |
| 0.5477 | 21.5630 |

Please select the cal type below
Cal Method : PWL

Please clear out the "Calibration Factor" and "Flow Rate" cells below if not using data point for calibration.

| Data Point | Calibration Factor | Flow Rate ft³/hr Prover | Flow Rate ft³/hr Meter | Flow Rate m³/hr Prover | Flow Rate m³/hr Meter | Velocity m/sec $V_p$ | Velocity ft/sec $V_p$ | Velocity m/sec $V_m$ | Velocity of ft/sec $V_m$ |
|---|---|---|---|---|---|---|---|---|---|
| 1 | 1.0024 | 919047.0 | 916847 | 26024.52 | 25962.21 | 30.683 | 100.668 | 30.610 | 100.43 |
| 2 | 1.0009 | 685737.0 | 685120 | 19417.91 | 19400.45 | 22.894 | 75.112 | 22.874 | 75.04 |
| 3 | 1.0000 | 459901.0 | 459901 | 13022.95 | 13022.95 | 15.354 | 50.375 | 15.354 | 50.38 |
| 4 | 1.0000 | 230187.0 | 230194 | 6518.17 | 6518.37 | 7.685 | 25.213 | 7.687 | 25.21 |
| 5 | 1.0000 | 92338.4 | 92338 | 2614.73 | 2614.73 | 3.083 | 10.114 | 3.083 | 10.11 |
| 6 | 0.9997 | 50378.2 | 50394 | 1426.55 | 1427.01 | 1.682 | 5.518 | 1.682 | 5.52 |
| 7 | 0.9989 | 23863.4 | 23490 | 675.74 | 676.48 | 0.797 | 2.614 | 0.798 | 2.62 |
| 8 | | | | | | | | | |
| 9 | | | | | | | | | |
| 10 | | | | | | | | | |
| 11 | | | | | | | | | |
| 12 | | | | | | | | | |
| SUMS | 7.001850 | | 2458684.27 | | | | | | |

Note : Velocity of Prover (Vp) is calculated based upon Prover flow

Peak-to-Peak of Error

Peak-to-Peak Error = 0.350%
Peak-to-Peak Error = 0.000%

*FIG. 7A*

| As Found error % | As Left error % | Verification Vel ft/sec Vp | Verification Results % |
|---|---|---|---|
| -0.24 | 0.000 | | |
| -0.09 | 0.000 | | |
| 0.00 | 0.000 | 60.037 | -0.011 |
| 0.00 | 0.000 | | |
| 0.00 | 0.000 | 20.568 | -0.002 |
| 0.03 | 0.000 | | |
| 0.11 | | | |

CHORDAL GAS FLOWMETER WITH TRANSDUCERS INSTALLED OUTSIDE THE PRESSURE BOUNDARY

FIELD OF THE INVENTION

The present invention is related to determining gas flow rates in a pipe with ultrasonic transducers of a flowmeter that send and receive signals into and from the gas flow through a window made of metal that is in acoustic communication with a channel in which the gas flows. (As used herein, references to the "present invention" or "invention" relates to exemplary embodiments and not necessarily to every embodiment encompassed by the appended claims.) More specifically, the present invention is related to determining gas flow rates in a pipe with ultrasonic transducers of a flowmeter that send and receive signals into and from the gas flow through a window made of metal that is in acoustic communication with a channel in which the gas flows where the transducers are disposed in housings that acoustically isolate the transducers so the signal-to-noise ratio of the transducers is improved more than 10 dB.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Ultrasound transducers are used to transmit and receive ultrasonic signals in a flowmeter system. Several problems were solved by using the present invention, they are: depressurizing the pipe gas line or the use of special tools for transducer replacement, poor transducer performance, and poor signal detection for gas meters at high flowrates. Current gas meters use gas wetted transducers since conventional transducer housings used in liquid meters cannot be used. Conventional liquid meter housings do not work in a gas environment for two reasons. First, conventional liquid transducer housings have thick metal windows that cannot transmit sound through gas. Second, the liquid transducer housings are traditionally welded to the meter body. This creates noise such that a received signal is poorly detected in a gas meter application. Wetted transducers are exposed to the gas which contains hydrogen sulfide. Hydrogen sulfide can overtime deteriorate transducers made of conventional solder joints and epoxies for electrical and mechanical connections within the transducer. In current gas meters, a metal seal is placed behind the transducer in order to maintain the pipe pressure and to prevent gas from leaking out. So if a transducer fails, the transducer has to be replaced using special tools that prevent the transducer from firing out of the flowmeter at high speeds due to pipe gas pressure. This may be deadly to the replacer if the tools are improperly handled because the transducer becomes a projectile under pipe gas pressure. If the gas pipeline has to be depressurized to replace transducers for safety reasons then the pipeline stops and revenue generated by its function is lost. Current gas meter transducers use either a monolithic PZT ceramic transducer or a Tonpilz transducer. These transducers suffer from poor bandwidth, poor signal to noise ratio and radial modes in the 100 to 300 kHz frequency range, the preferred operation ultrasonic frequency range for gas meters. As a result, the received signals can be very distorted and result in poor transit time measurements and poor accuracy of a gas flowmeter at high flow rates >60 feet/second. Current gas meters also have metal to metal contact between parts even with wetted transducers which cases are made of metal so the flow meter can suffer from poor signal to noise ratio due to acoustic noise of the system.

BRIEF SUMMARY OF THE INVENTION

The present invention pertains to a flowmeter for measurement of natural gas where accuracy and reliability are essential for custody transfer measurement. The flowmeter measures gas flow rates in a pipe having a channel disposed in the pipe through which natural gas in the pipe flows and plane waves generated by multiple upstream ultrasonic transducers and multiple downstream ultrasonic transducers propagate per plane. The flowmeter defines two crossing planes but may have more or fewer. An important feature of this meter is that the transducer elements can be safely checked or replaced without special tools and without depressurizing the line because of housings which hold the transducer and contain the pipe pressure.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
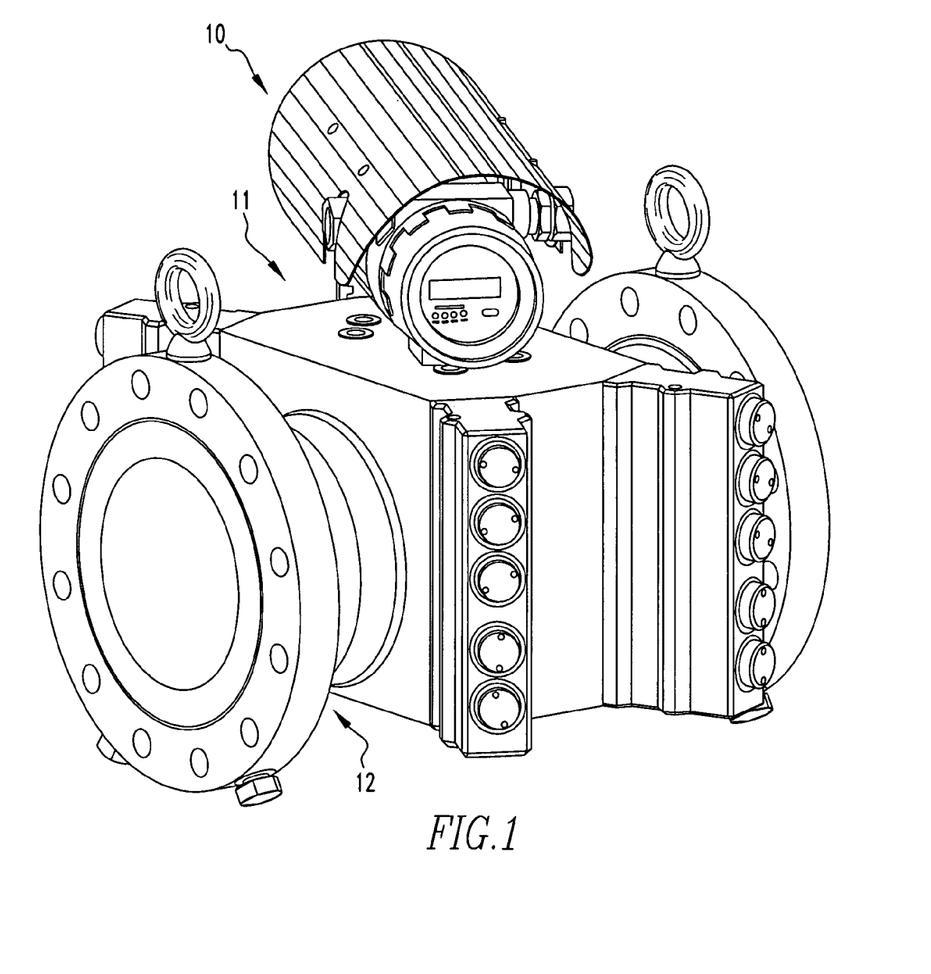
FIG. 1 shows a flowmeter of the present invention.
Figure 2:
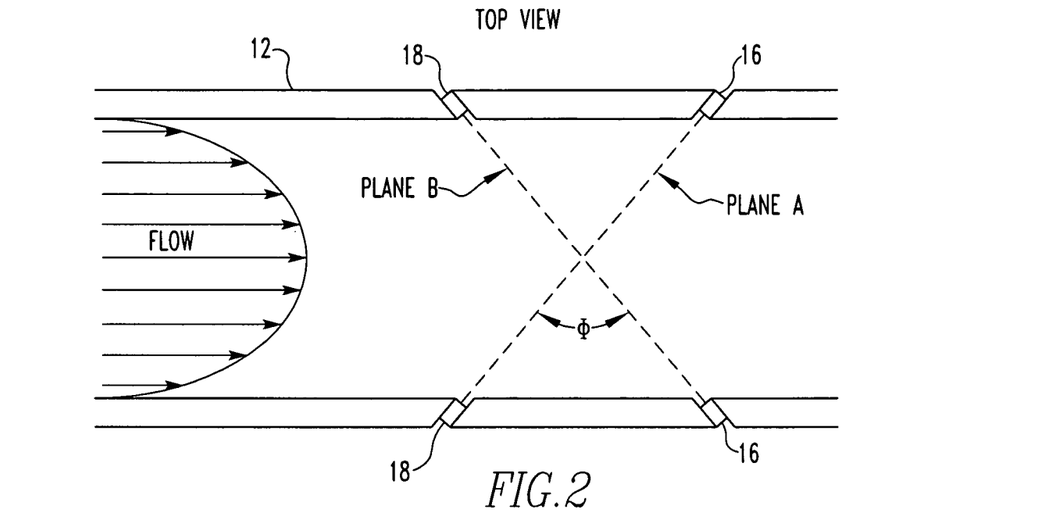
FIG. 2 shows a flowmeter top section of two crossing planes (A and B).
Figure 3:
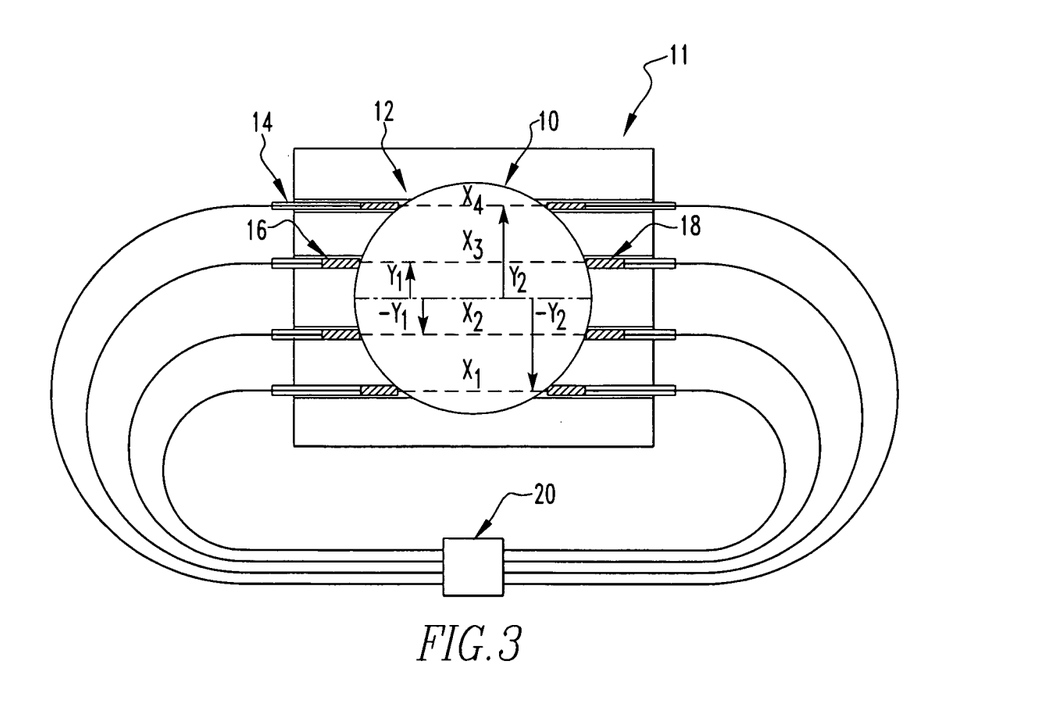
FIG. 3 shows a flowmeter cross section of along either Plane A or Plane B.

Referring now to the drawings wherein like reference numerals refer to similar or identical parts throughout the several views, and more specifically to FIGS. 1-3 thereof, there is shown a flowmeter for detecting gas flow rates in a pipe. The flowmeter comprises a container 11 configured to be attached to the pipe having a channel through which the gas flows, and a plurality of recesses. Each recess has a window made of metal that is in acoustic communication with the channel. The flowmeter comprises a plurality of transducers, with one transducer of the plurality of transducers disposed in each recess. The transducers transmit ultrasonic signals into and receiving ultrasonic signals from the channel through the window in the housing recess in which a transducer is disposed. The flowmeter comprises a controller in electrical communication with the plurality of transducers which determines the gas flow rate through the channel from signals received from the transducers.

The window may have a thickness less than ¼ wavelength (λ) of the window's material. The window thickness may be about λ/10 of the window's material. The flowmeter may include transducer housings disposed in the recesses that extend through the container 11 in which the transducers are disposed. The window may be a pressure boundary which contains the pressure in the channel and essentially prevents gas in the channel from escaping into the housing, the window forming a gas tight seal with the channel. The transducers may be removed from the recesses without having to depressurize the pipe.

The ultrasonic signals transmitted and received by the transducers may define a first path in a first plane and a second path in a second plane which cross in the channel. The flowmeter may include acoustic isolators which acoustically isolate the transducer housings from the container 11.

The transducer may couple to the window. The flowmeter may include a spring assembly disposed in each housing which applies a force against the transducer to hold the transducer in contact with the window. The flowmeter may include a plurality of transformers, with each transducer in electrical communication with one of the plurality of transformers.

Each path of each plane may include an upstream ultrasonic transducer and a downstream ultrasonic transducer configured so plane waves generated by the downstream transducer propagate through the channel and are received by the upstream transducer which produces an upstream transducer signal. Furthermore the plane waves generated by the upstream transducer propagates through the channel and are received by the downstream transducer which produces a downstream transducer signal, the controller determining the gas flow rate from the upstream transducer signal and the downstream transducer signal. Each transducer may be a broad band piezoelectric composite transducer with a coupling coefficient ($k_t$) greater than 0.7 out of 1 and an acoustic impedance (Z) of less than 34 Mrayls.

Figure 4:
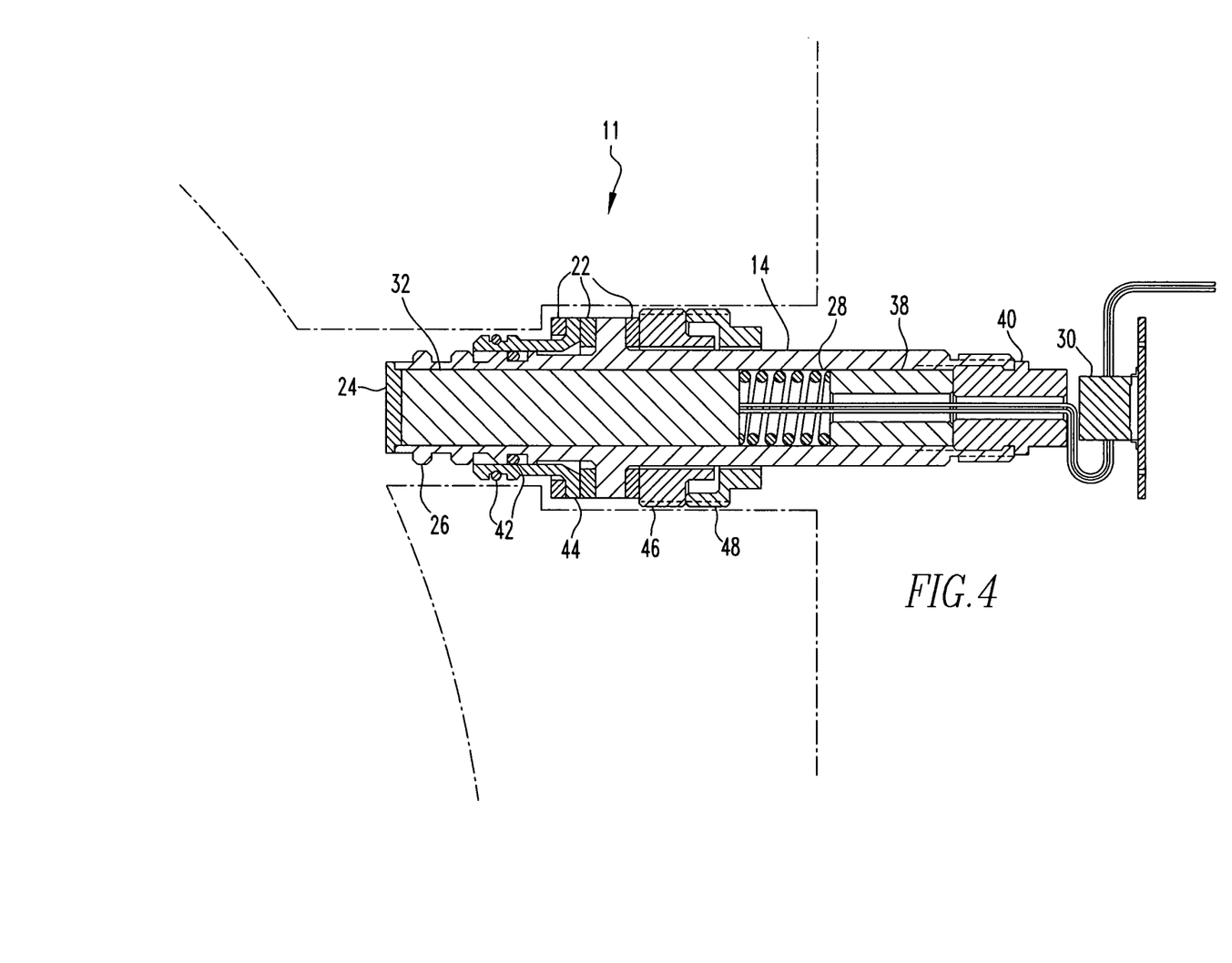
FIG. 4 shows a gas meter arrangement.

The present invention pertains to a housing, as shown in FIG. 4, for an ultrasonic transducer for a flowmeter which is inserted into a recess of a container 11. The housing comprises a shell in which the transducer is disposed. The shell has an outer surface and a flange that extends from the outer surface of the shell and a plurality of acoustic ribs disposed in proximity to an end of the shell from which signals are emitted by the transducer. The shell improves the signal-to-noise ratio more than 10 dB, and even 20 or 40 dB. The ribs attenuate essentially all non-gas paths of sound.

The housing may include an acoustic isolator disposed about the housing which contacts the container 11 and the housing when the transducer is disposed in the recess of the container 11 with the acoustic isolator disposed between the pipe and the housing so the housing does not contact the container 11. The acoustic isolator may include plastic discs resistant to hydrogen sulfide disposed about the flange of the housing. There may be no metal to metal contact between the housing and the container 11.

The present invention pertains to a method for detecting gas flow rates in a pipe. The method comprises the steps of transmitting ultrasonic signals from a plurality of transducers disposed in recesses in a container 11 attached to the pipe through a window made of metal of each recess into a channel of the container 11 in which the gas flows, with one transducer of the plurality of transducers disposed in each recess and the window in acoustic communication with the channel. There is the step of receiving ultrasonic signals from the channel through the windows by the transducers in the recesses. There is the step of determining the gas flow rate through the channel from signals received from the transducers by a controller in electrical communication with the plurality of transducers.

The window may be a pressure boundary which contains the pressure in the channel and essentially prevents gas in the channel from escaping into the housing, the window forming a gas tight seal with the channel and there may be the step of removing one of the transducers from the recess the one transducer in which the transducer is disposed without having to depressurize the pipe. The transmitting step may include the step of transmitting ultrasonic signals by the transducers along a first path in a first plane and a second path in a second plane which cross in the channel and the receiving step includes the step of receiving ultrasonic signals by the transducers from the first path and from the second path.

There may be the step of acoustically isolating housings in which the transducers are disposed in the recesses from the container 11 with acoustic isolators. There may be the step of applying a force against the transducer to hold the transducer in contact with the window. The transmitting step may include the steps of generating with an upstream ultrasonic transducer of the first path plane waves that propagate through the channel and are received by a downstream ultrasonic transducer of the first path there may be the step of producing a downstream transducer signal with the downstream transducer from the plane waves the downstream transducer receives. There may be the step of generating with the downstream ultrasonic transducer of the first path plane waves that propagate through the channel and are received by the upstream ultrasonic transducer of the first path. There may be the step of producing an upstream transducer signal with the upstream transducer from the plane waves the upstream transducer receives. There may be the step of determining with the controller the gas flow rate from the upstream transducer signal and the downstream transducer signal.

Figures 5A, 5B:
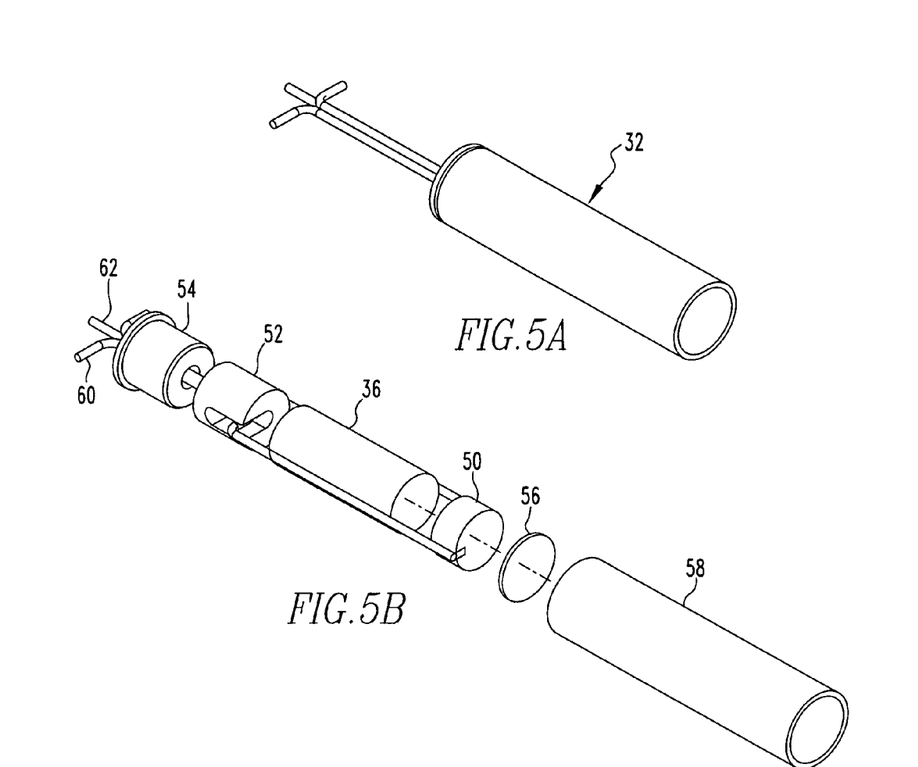
FIG. 5a shows a gas transducer.
FIG. 5b shows an exploded view of a gas transducer.

The present invention pertains to a transducer, as shown in FIG. 5, for an ultrasonic flowmeter. The transducer comprises a case. The transducer comprises a broad band piezoelectric composite disposed in the case with a coupling coefficient ($k_t$) greater than 0.7 out of 1 and an acoustic impedance of less than 34 Mrayls.

In another embodiment, the housing and transducer described herein, as well as the overall technique described herein, may be applied directly to a pipe where the recesses are formed in the pipe and the housings with transducers are inserted into the recesses in the pipe itself.

In the operation of the invention, the flowmeter is capable of measuring gas flow rates with ultrasonic transit time technology. The application is specifically applied to natural gas metering. A novel aspect of the flowmeter is the transducer housing which has a metal window less than $\lambda/10$ thick of the window material. The preferred metal window is a titanium window. The titanium window is thin enough such that it is nearly acoustically transparent, serves as a hermetic seal from the natural gas which may contain hydrogen sulfide and the window acts as a pressure barrier to gasses in the pipe. A wavelength ($\lambda$) of titanium at 200 kHz is 30.35 mm when the speed of sound in the material is 6070 m/s. The titanium window is laser welded to the titanium transducer housing. Laser welding is a low heat process compared to torch welding therefore there is no damage to the mechanical integrity of the $\lambda/10$ thick (3 mm) titanium window to the housing. The window serves to maintain the mechanical integrity of the transducer housing by being a pressure barrier from the pressurized gas. Typical operation pressure ratings range from 475 psi (ANSI 150) to 3,705 psi (ANSI 1500). The operating temperatures range from −40 C to 100 C. The gas flow meter has replaceable transducers without having to depressurize the line. All transducer housings have acoustic ribs which are spaced $\lambda/8$ to $\lambda/4$ apart to isolate the acoustic noise of the transducer housing and breakup the transducer housing resonance. In addition, all transducer housings are acoustically isolated from the meter body by acoustic isolators.

Special transducers have been fabricated using composite piezoelectric technology. The composite piezoelectric material has a $k_t$ of 0.75 and low Z of 17 MRayls. This enables broad band performance for an easily detectable leading edge. Each transducer uses a 7:1 impedance matching transformer which improves performance by 17 dB due to magnifying the excitation voltage by factor of 7. This transducer arrangement coupled to a titanium window, $\lambda/10$ is desired for adequate performance of an ultrasonic gas meter that uses a window as a pressure barrier greater than 3,705 psi.

A flowmeter for detecting gas flow rates in a pipe preferably includes a total of eight paths, four paths per plane disposed in the pipe through which gas in the pipe flows. The upstream transducer is in contact with the titanium window within the transducer housing and positioned such that plane waves generated by the upstream transducer propagates through the channel. The downstream transducer is acoustically isolated from the pipe and positioned such that plane waves generated by the downstream transducer propagate through the channel and are received by the upstream transducer which produces an upstream transducer signal. The downstream transducer receives the plane waves from the upstream transducer and provides a downstream transducer signal. The flowmeter includes a signal processor known as a controller in communication with the upstream and downstream transducers which calculates gas flow rate from the upstream transducer signals and the downstream transducer signals.

Referring to FIGS. 1-3, the flowmeter 10 comprises a channel disposed in the pipe 12 through which gas in the pipe 12 flows. The flowmeter 10 comprises two crossing planes. There is an angle θ between the planes, typically 90 degrees. Each plane comprises multiple upstream ultrasonic transducers 16 within transducer housings 14 acoustically isolated from the pipe 12 and positioned so plane waves generated by a upstream transducer 16 propagate through the channel. Each plane comprises multiple downstream ultrasonic transducers 18, each within a transducer housing 14 acoustically isolated from the pipe 12 and positioned so plane waves generated by the downstream transducer 18 propagate through the channel and are received by the upstream transducer 16 which produces an upstream transducer 16 signal. The downstream transducer 18 receives the plane waves from the upstream transducer 16 and provides a downstream transducer 18 signal. The flowmeter 10 comprises a controller 20 in communication with the upstream and downstream transducers 18 which calculates gas flow rate from the upstream transducer 16 and the downstream transducer 18 signals.

The transducer housing 14 is made of titanium which is corrosion resistant to natural gas components such as hydrogen sulfide. The upstream transducer 16 and the downstream transducer 18 are coupled to a window 24 within the transducer housing. The transducer housings are acoustically isolated by acoustic isolators 22 which contact the pipe 12. The window 24 forms a seal with the transducer housing 14 preventing gas in the pipe 12 leaking into the transducer housing 14. The window 24 which is inclusive of the transducer housing 14 is sealed via laser welding such that hydrogen sulfide cannot leak inside. The transducer 32 couples to the acoustic window 24 using a silicone grease. A spring assembly 28 applies pressure to the transducer 32 in order to couple the ultrasonic signal more effectively to the window 24. A spacer 38 and compression nut 40 compress the spring assembly 28 such that at least 100 psi is applied to the transducer 32. O-rings 42 are placed around the transducer housing 14 and a bushing 44 in order to create another gas tight seal between the transducer housing 14 and the pipe 12. The bushing 44 provides mechanical support for the transducer housing 14 and positions the transducer housing 14 within the pipe 12. The load nut 46 and lock nut 48 secure the transducer housing 14 to the pipe 12 by applying pressure to the acoustic isolators 22 and prevents the transducer housing 14 from being force out of the pipe 12 under pipe pressure. There is an air gap radially between the transducer housing 14 and load nut 46 and lock nut 48 so there is no metal to metal contact between the pipe 12 and the transducer housings 14.

Shown in FIG. 5 is a transducer 32 consisting of a wearface 56, piezocomposite 50 and delay line 36 that is potted in a brass case 58 with a load cylinder 52 and a cap 54. The wearface 56 is made of high purity alumina ($Al_2O_3$) greater than 96% with a density of around 3.64 $gm/cm^3$, a hardness greater than 1000 Knoops and the thickness $\ll\lambda$. The piezocomposite 50 is a 1-3 composite material preferably made from PZT-5H and epoxy (Smart Material Inc., Sarasota, Fla.). The volume fraction of PZT-5H is around 50% this produces a high coupling coefficient, $k_t$ of 0.75 out of 1. Having a high coupling coefficient is necessary because it improves the signal to noise ratio of the ultrasonic signal. The acoustic impedance known as $Z=\rho v$, where density $\rho$ ($kg/m^3$) and velocity v (m/s), is around 17 MRayls. The delay line 36 serves two purposes: as a reflection delay line and as an acoustic attenuator. The delay line 36 is made of metal iron filings filled with epoxy of at a low volume fraction, typically 15%. The delay line 36 is long enough such that the reflection is more than several wavelengths away from the piezoelectric element. A typical speed of sound for the delay line 36 is 1277 m/s. A wave length in a delay line 36 at 200 kHz is 6.3 mm. A typical length of a delay line 36 for this application is thirty two mm. Therefore, once a signal is received by the transducer 32 it takes a reflection twice the time of a delay line 36 before the reflection is received as reverberation by the transducer 32. In this case the reflection occurs fifty microseconds later than the detectable signal. Attenuation in the delay line 36 is typically, 2.29 dB/cm, so round trip attenuation of a reflected signal would be 14.65 dB. In order to make electrical connections to piezocomposite 50, a (+) wire 60 and a (−) wire 62 are soldered to silver foil which is bonded to the piezocomposite 50 using silver epoxy. The entire transducer 32 is potted with non conductive epoxy in order to encapsulate and insulate all components.

Depending on the specific operating conditions of the meter, either a 100 kHz or 200 kHz frequency transducer 32 is used. A broad band composite transducer 32 is necessary for metering natural gas. Unique to gas applications, when flow rate >60 feet/second is present the acoustic wave is distorted by the flow and the wave front is received by a transducer 32. If a broad band composite transducer 32 is used instead of a typical monolithic PZT transducer or Tonpilz transducer there is less distortion of the received acoustic wave. The upstream and downstream transit time signals are detected in order to make a flow measurement by the controller 20. The composite transducer 32 has a rising edge of the received ultrasonic pulse that can be more accurately detected by the controller thus calculating a more accurate transit time measurement.

An electrical transformer 30 is put in series with each transducer 32 to amplify the transmit voltage by a factor N of seven, FIG. 4. The pulser is represented by an AC voltage V in series with an inductor, $L_1$, the first winding of the transformer and the impedance Z of a transducer is in series with the other inductor, $L_2$, known as the second winding of the transformer. The equivalent circuit is shown when the pulser, V is directly in series with the impedance Z of the transducer and the impedance is reduced by the number of turns squared, $N^2$. For example, a 300 volt input pulse peak to peak will be amplified to 2100 volts peak to peak, since the voltage is multiplied by a factor of N, in this case 7. The electrical impedance of each transducer 32 (4900Ω) is also reduced $N^2$ in case by 49 to 100Ω in order to match to the 100Ω transmit and receive electronics. Each transducer 32 is spring loaded by the spring assembly 28 inside the transducer housing 14 in order for the wearface 56 to make sufficient mechanical contact to the window 24. Grease is used for acoustic coupling of the transducer 32 to the window 24.

The transducer housing 14 has acoustic ribs 26, acoustic isolators 22, and a window 24. The acoustic ribs 26 are spaced $\lambda/4$ to $\lambda/8$ apart in order to cancel acoustic noise. During the excitation of an ultrasonic transducer 32 which is coupled to the window 24, a low amplitude acoustic wave either longitudinal or shear propagates along the transducer housing 14. The wave propagates according to the wave equation:

$$\frac{d^2 y}{dx^2} = \frac{1}{c^2}\frac{d^2 y}{dt^2}$$

When a longitudinal or shear wave is reflected from a rib interface its phase changes $\omega=\pi$ or 180 degrees~t=T/2 or $x=\lambda/2$, it then interferes with an incoming wave to destructively cancel it. Therefore, $$y(x,t) = y_1(ct-x) - y_1(ct+x) = 0$$

Since the ambient noise generated in the transducer housing 14 can be at many frequencies and amplitudes there isn't perfect cancellation. This improves the signal to noise ratio of the received ultrasound signal up 10 dB.

The acoustic isolators 22 are made of Polyether Ether Ketone (PEEK) disks (thickness $>\lambda$) that fit around the transducer housing 14 between a flange 34. The acoustic isolators 22 are in contact with the pipe 12 but the flange 34 is not. The total noise loss from noise attenuation can be calculated using transmission equations using the following formula:

$$\text{Loss (dB)} = 20\log10\left(\frac{p_o}{p_{in}}\right) = \frac{16 * (z_{peek})^2 z_{steel} z_{Ti}}{(z_{peek} + z_{Ti})^2(z_{peek} + z_{steel})^2}$$

Where $P_o$ is pressure output, $P_{in}$ pressure input, $Z_{peek}$, the acoustic impedance of PEEK is 3 Mrayls, $Z_{steel}$, the acoustic impedance of Steel is 45 Mrayls, and $Z_{Ti}$, the acoustic impedance of Titanium is 30 Mrayls. The loss calculation is 22 dB but more loss is possible since the PEEK, steel and titanium parts are pressed together and not mechanically bonded.

The window 24 is less than wavelength thick such that it becomes acoustically transparent. According to transmission line theory the acoustic impedance of material becomes closer to that acoustic impedance the thinner it becomes. When the thickness of the titanium window 1 is $\lambda/10$ of titanium, the acoustic energy transmits through the window 24 into gas without signal distortion. The equation for transmission line theory is:

$$Z_w = Z_{Ti}\frac{Z_A + jZ_{Ti}\tan(\beta l)}{Z_{Ti} + jZ_A \tan(\beta l)}$$

$Z_A$: Acoustic Impedance of Air
$Z_{Ti}$: Acoustic Impedance of Titanium
$Z_w$: Acoustic Impedance of the window of thickness l
$C_{Ti}$: Speed of Sound in Titanium
f: Frequency of ultrasound wave
$\lambda = C_{Ti}/f$: Wavelength in Titanium
$\beta = 2\pi/\lambda$ Since titanium has lower acoustic impedance than steel, it is the best metal to use acoustically that is resistant to hydrogen sulfide.

The ultrasonic flow meter 10 arrangement uses multiple transducers 32 each within a transducer housing 14, there are two crossing planes, multiple chordal paths per plane distributed in spacing according to numerical integration rules in order to accurately sample the velocity profile in a pipe 12. A path consists of one transducer 32 upstream from the gas flow and another is downstream from the gas flow, both transducers 32 transmit and receive signals. The difference in transit times between the upstream and downstream signal is used to calculate a velocity per path. The path velocities are integrated by the controller 20 to calculate a flow rate. These equations can be modified for Mach number.

For C>>V:
L: path length
$L_{chord}$: chord path length
$v_{axial}$: axial gas velocity
Q: Volume flow
D: diameter of opening
$\phi$: path angle
$t_1$: upstream transit time
$t_2$: downstream transit time
$\Delta t$: $t_2 - t_1$
$V_{path}$: gas velocity per path
$w_i$: Weighting factor per path $$Q = \iint_{cross\ section} v_{axial}(x,y) dx dy$$

$$L_{path}V_{path} = \frac{1}{2}\frac{L_{path}^2 \Delta t}{t_2 t_1}$$

$$V_{path} = V_{axial}\sin\varphi$$

$$L_{path} = \frac{L_{chord}}{\cos\varphi}$$

$$V_{axial}L_{chord} = \frac{1}{2}\frac{L_{path}^2 \Delta t}{t_2 t_1 \tan\varphi}$$

In order directly to measure volumetric flow, one must integrate the axial fluid velocity over a cross section normal to the pipe 12 axis. In order to solve for the speed of sound in gas and gas velocity, the upstream and downstream transit times need to be measured via a controller 20. The controller 20 computes the transit time differences between the upstream and downstream transit times per path length. The $V_{axial}L_{chord}$ product is exactly the line integral of $V_{axial}$ dy at a chord location. The $V_{axial}L_{chord}$ product is calculated for each location $x_1, x_2, x_3, x_4$ in FIG. 3, effectively dividing the pipe 12 cross-section into four segments per plane. The effective width of each segment is a fraction of the internal diameter, D, measured along the x axis. Either Legendre or Jacobian/Chebychev spacing and weighting are used for chordal flowmeters, the path locations y, and weighting factors w were not chosen arbitrarily but comply with numerical integration rules. The spacing is measured from the center of the pipe 12, the spacing $y_1, y_{y2}, -y_1, -y_2$ is shown in Table 1 along with the weighting factors. The length of each chord is known either by calculation or measurement.

TABLE 1

Flowmeter Path Spacing and Weighting Factors

| Location y-axis | Legendre Spacing | Legendre weighting | Jacobian/ Chebychev Spacing | Jacobian/ Chebychev weighting |
|---|---|---|---|---|
| $y_1$ | .34 * Diameter/2 | .77 | .30 * Diameter/2 | .72 |
| $y_2$ | .86 * Diameter/2 | .22 | .80 * Diameter/2 | .27 |
| $-y_1$ | −.34 * Diameter/2 | .77 | −.30 * Diameter/2 | .72 |
| $-y_2$ | −.86 * Diameter/2 | .22 | −.80 * Diameter/2 | .27 |

The flow Q can now be calculated by the following equation:

$$Q = D[w_1 L\text{chord}_1 v\text{axial}_1 + w_2 L\text{chord}_2 v\text{axial}_2 + w_3 L\text{chord}_3 v\text{axial}_3 + w_4 L\text{chord}_4 v\text{axial}_4].$$

Where $w_1 = w_4$ and $w_2 = w_4$; $L\text{chord}_1 = L\text{chord}_4$, $L\text{chord}_2 = L\text{chord}_3$.

A 24 inch diameter (21.56" ID) ultrasonic gas flowmeter 10 with eight paths was fabricated as described in this invention and calibrated to a known standard at the CEESI gas calibration facility in Iowa. Results show (FIG. 5) the percent error as function of a range of velocities from 2 ft/s to 100 ft/s. Native Linearity (that is; the 24 inch meter without correction) was determined to be only +/−0.175%. The pipe 12 is fabricated from carbon steel in accordance ASME B31.3 Process Piping Code. The controller 12 is designed in compliance to UL/cUL Class 1, Division 1, Groups C & D.

The meter sizes, flowrates and velocities are described in Table 2. Flowrates shown are based on schedule 40 (std) pipe ID. Over-range flowrates are at 120 fps.

TABLE 2

Meter Sizes, Flowrates, and Velocities

| Meter Size | | Flow Rate—ft³/hr | | | Flow Rate—m³/hr | | |
|---|---|---|---|---|---|---|---|
| Inches | DN | Min | Max | Over-range | Min | Max | Over-range |
| 8 | 200 | 2,500 | 125,000 | 150,000 | 71 | 3,550 | 4,250 |
| 10 | 250 | 3,950 | 197,000 | 237,000 | 110 | 5,580 | 6,700 |
| 12 | 300 | 5,600 | 280,000 | 336,000 | 160 | 7,900 | 9.500 |
| 16 | 400 | 8,850 | 442,000 | 530,000 | 250 | 12,500 | 15,000 |
| 20 | 500 | 13,900 | 695,000 | 834,000 | 400 | 19,700 | 23,600 |
| 24 | 600 | 20,100 | 1,010,000 | 1,210,000 | 570 | 28,500 | 34,200 |

Figure 6:
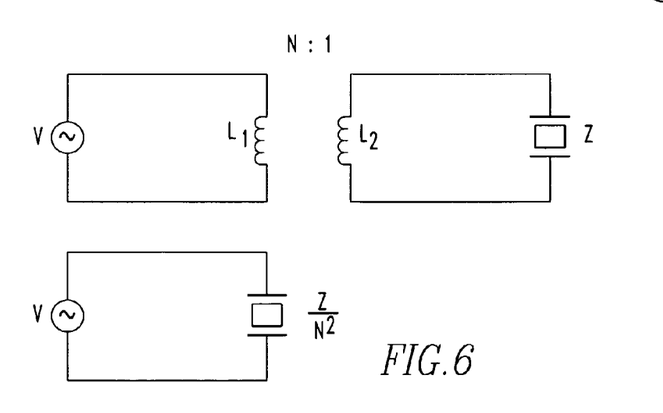
FIG. 6 shows the transformer application.
Figure 7A:
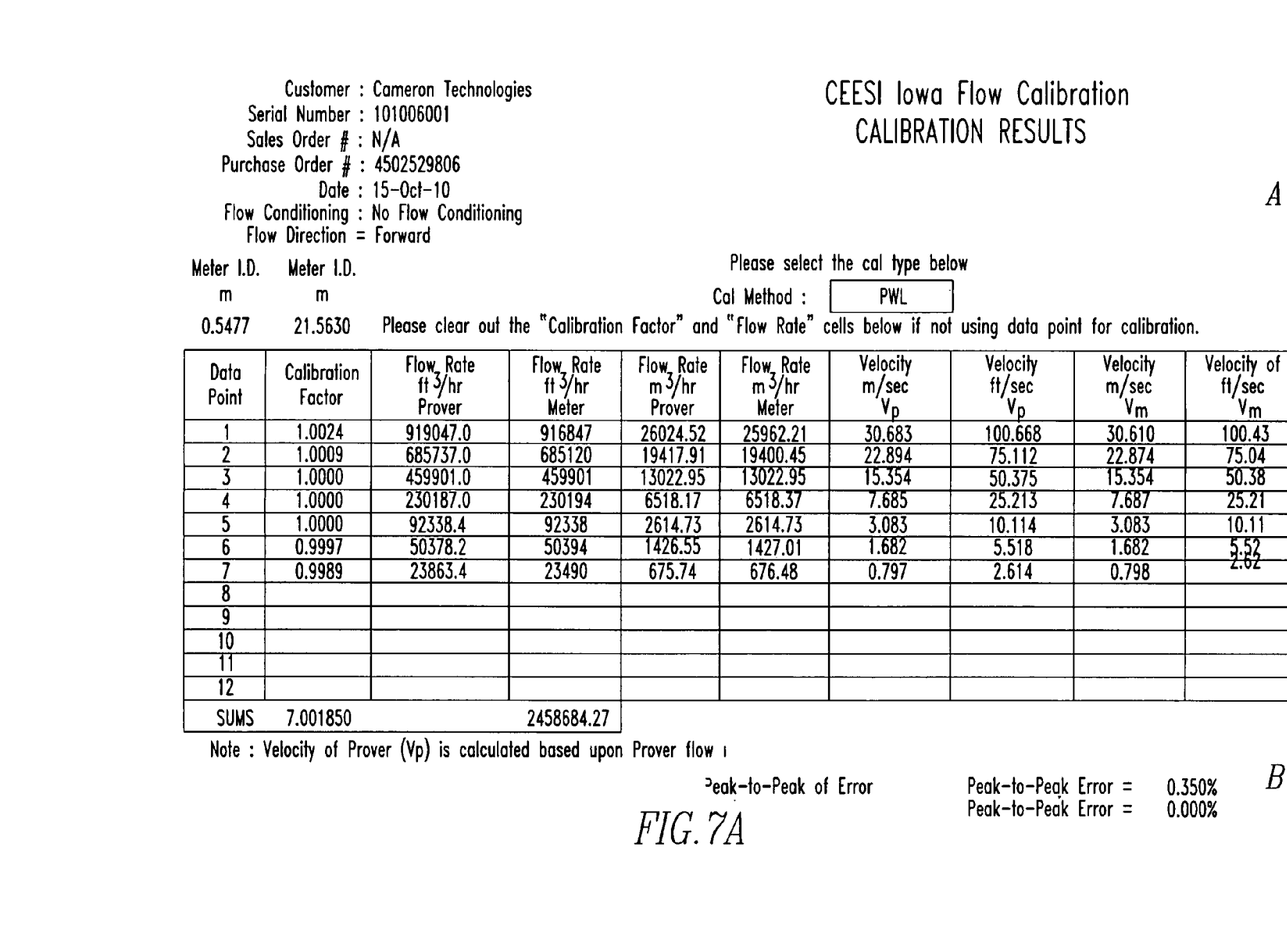
FIGS. 7a and 7b, which together are one continuous drawing, show a demonstration of transit time flow meter performance.
Figure 7B:
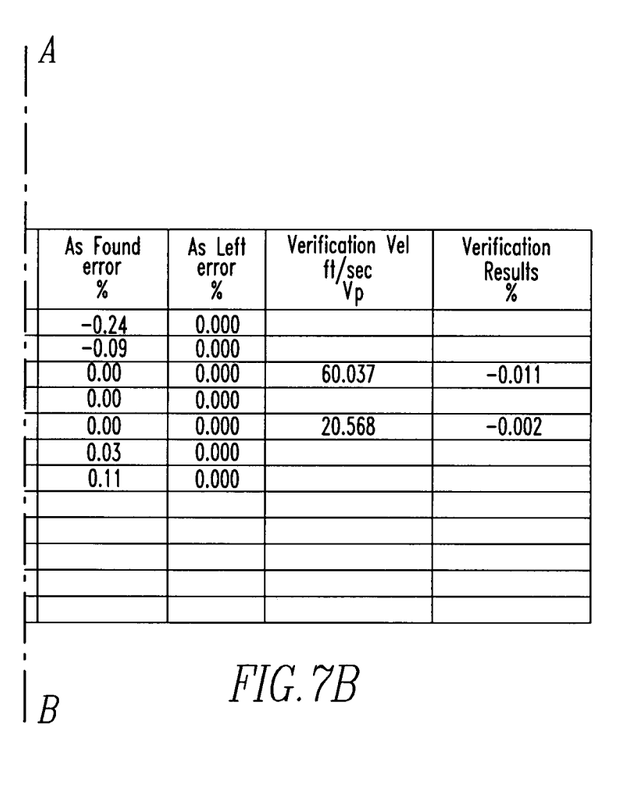
Figure 8A:
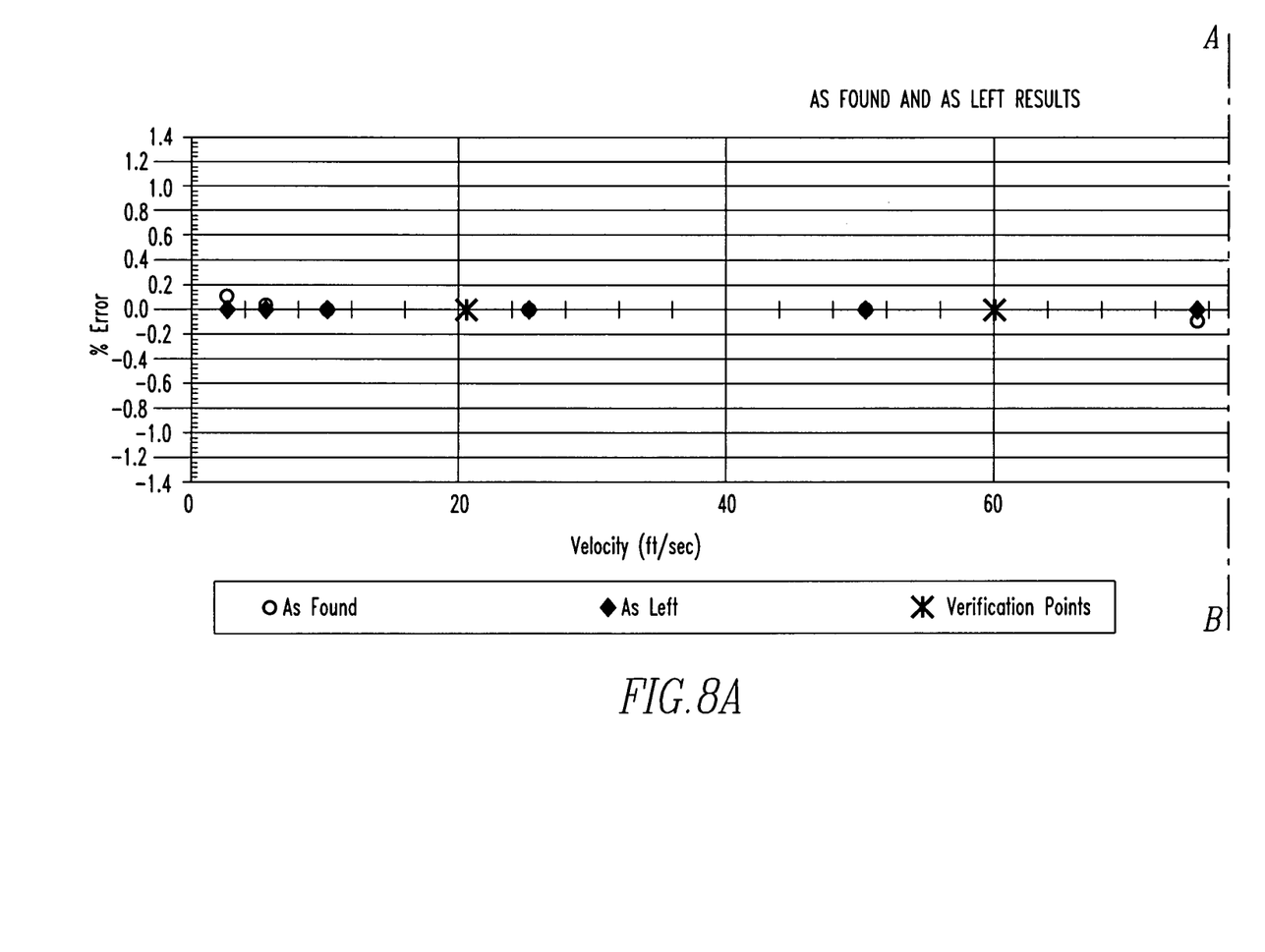
FIGS. 8a and 8b, which together are one continuous drawing, show error vs. velocity in regard to the claimed invention.
Figure 8B:
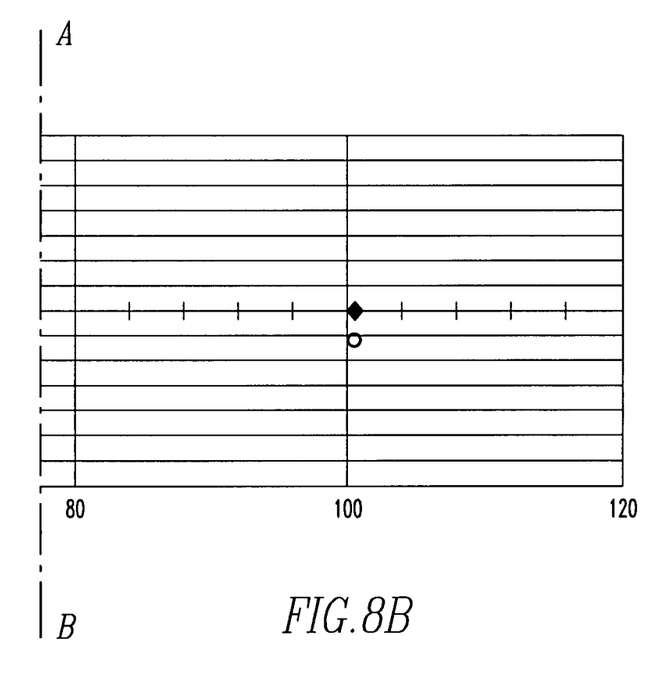

FIG. 6 shows the transformer application. FIGS. 7a and 7b, which together are one continuous drawing, show a demonstration of transit time flow meter performance. FIGS. 8a and 8b, which together are one continuous drawing, show error vs. velocity in regard to the claimed invention.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A flowmeter for detecting gas flow rates in a pipe comprising:
a container configured to be attached to the pipe having a channel through which the gas flows, and a plurality of recesses, each recess having a window made of titanium that is in acoustic communication with the channel;
a plurality of transducers, with one transducer of the plurality of transducers disposed in each recess, the transducers transmitting ultrasonic signals into and receiving ultrasonic signals from the channel through the window in the recess in which a transducer is disposed; and
a controller in electrical communication with the plurality of transducers which determines the gas flow rate through the channel from signals received from the transducers.

2. The flowmeter as described in claim 1 wherein the window has a thickness less than ¼ wavelength of the window's material.

3. The flowmeter as described in claim 2 wherein the window thickness is about 3 mm of the window's material.

4. The flowmeter as described in claim 3 including transducer housings disposed in the recesses that extend through the pipe container in which the transducers are disposed.

5. The flowmeter as described in claim 4 wherein the window is a pressure boundary which contains the pressure in the channel and essentially prevents gas in the channel from escaping into the housing, the window forming a gas tight seal with the channel.

6. The flowmeter as described in claim 5 wherein the transducers can be removed from the recesses without having to depressurize the pipe.

7. The flowmeter as described in claim 6 wherein the ultrasonic signals transmitted and received by the transducers define a first path in a first plane and a second path in a second plane which cross in the channel.

8. The flowmeter as described in claim 7 including acoustic isolators which acoustically isolate the transducer housings from the pipe container.

9. The flowmeter as described in claim 8 wherein the transducer couples to the window.

10. The flowmeter as described in claim 9 including a spring assembly disposed in each housing which applies a force against the transducer to hold the transducer in contact with the window.

11. The flowmeter as described in claim 10 including a plurality of transformers, with each transducer in electrical communication with one of the plurality of transformers.

12. The flowmeter as described in claim 11 wherein each path of each plane includes an upstream ultrasonic transducer and a downstream ultrasonic transducer configured so plane waves generated by the downstream transducer propagate through the channel and are received by the upstream transducer which produces an upstream transducer signal, and plane waves generated by the upstream transducer propagates through the channel and are received by the downstream transducer which produces a downstream transducer signal, the controller determining the gas flow rate from the upstream transducer signal and the downstream transducer signal.

13. The flowmeter as described in claim 12 wherein each transducer is a broad band piezoelectric composite transducer with a coupling coefficient greater than 0.7 out of 1 and an acoustic impedance of less than 34 Mrayls.

14. A method for detecting gas flow rates in a pipe comprising the steps of:
- transmitting ultrasonic signals from a plurality of transducers disposed in recesses in a container attached to the pipe through a window made of titanium of each recess into a channel of the container in which the gas flows, with one transducer of the plurality of transducers disposed in each recess and the window in acoustic communication with the channel;
- receiving ultrasonic signals from the channel through the windows by the transducers in the recesses; and
- determining the gas flow rate through the channel from signals received from the transducers by a controller in electrical communication with the plurality of transducers.

15. The method as described in claim 14 wherein the window is a pressure boundary which contains the pressure in the channel and essentially prevents gas in the channel from escaping into the housing, the window forming a gas tight seal with the channel and there is the step of removing one of the transducers from the recess the one transducer in which the transducer is disposed without having to depressurize the pipe.

16. The method as described in claim 15 wherein the transmitting step includes the step of transmitting ultrasonic signals by the transducers along a first path in a first plane and a second path in a second plane which cross in the channel and the receiving step includes the step of receiving ultrasonic signals by the transducers from the first path and from the second path.

17. The method as described in claim 16 including the step of acoustically isolating housings in which the transducers are disposed in the recesses from the container with acoustic isolators.

18. The method as described in claim 17 including the step of applying a force against the transducer to hold the transducer in contact with the window.

19. The method as described in claim 18 wherein the transmitting step includes the steps of:
- generating with an upstream ultrasonic transducer of the first path plane waves that propagate through the channel and are received by a downstream ultrasonic transducer of the first path;
- producing a downstream transducer signal with the downstream transducer from the plane waves the downstream transducer receives;
- generating with the downstream ultrasonic transducer of the first path plane waves that propagate through the channel and are received by the upstream ultrasonic transducer of the first path;
- producing an upstream transducer signal with the upstream transducer from the plane waves the upstream transducer receives; and
- determining with the controller the gas flow rate from the upstream transducer signal and the downstream transducer signal.

* * * * *